US009026650B2

(12) United States Patent
Bank et al.

(10) Patent No.: US 9,026,650 B2
(45) Date of Patent: May 5, 2015

(54) HANDLING OF WEBSITE MESSAGES

(71) Applicant: International Business Machines Corporation, Armonk, NY (US)

(72) Inventors: Judith H. Bank, Morrisville, NC (US); Liam Harpur, Dublin (IE); Ruthie D. Lyle, Durham, NC (US); Patrick O'Sullivan, Dublin (IE); Lin Sun, Morrisville, NC (US)

(73) Assignee: Innternational Business Machines Corporation, Armonk, NY (US)

( * ) Notice: Subject to any disclaimer, the term of this patent is extended or adjusted under 35 U.S.C. 154(b) by 258 days.

(21) Appl. No.: 13/645,108

(22) Filed: Oct. 4, 2012

(65) Prior Publication Data

US 2014/0101258 A1      Apr. 10, 2014

(51) Int. Cl.
*G06F 15/173*     (2006.01)
*H04L 12/58*      (2006.01)

(52) U.S. Cl.
CPC ............... *H04L 51/04* (2013.01); *H04L 51/12* (2013.01)

(58) Field of Classification Search
CPC ..... H04L 63/0823; H04L 67/22; G06F 11/34; G06F 11/3438; G06F 21/33
USPC .......... 709/203, 206, 217, 219, 224; 713/156; 726/1
See application file for complete search history.

(56) References Cited

U.S. PATENT DOCUMENTS

| 6,324,645 | B1 | 11/2001 | Andrews et al. | |
| 7,627,896 | B2 | 12/2009 | Herrmann | |
| 7,882,550 | B2 | 2/2011 | Wray et al. | |
| 2002/0023208 | A1* | 2/2002 | Jancula | 713/156 |
| 2004/0059590 | A1* | 3/2004 | Mercredi et al. | 705/1 |
| 2006/0015729 | A1 | 1/2006 | Novack et al. | |
| 2009/0228986 | A1* | 9/2009 | Adler et al. | 726/26 |
| 2012/0079395 | A1* | 3/2012 | Bengualid et al. | 715/745 |
| 2012/0311151 | A1* | 12/2012 | Paulsen et al. | 709/225 |
| 2013/0269017 | A1* | 10/2013 | Patil | 726/8 |
| 2014/0075185 | A1* | 3/2014 | Dragomir et al. | 713/156 |

OTHER PUBLICATIONS

Oppliger et al., "A Distributed Certificate Management System (DCMS) Supporting Group-Based Access Controls" < (ASCAC '99), pp. 241-248.

* cited by examiner

*Primary Examiner* — Liangche A Wang
*Assistant Examiner* — Johnny Aguiar
(74) *Attorney, Agent, or Firm* — Scully, Scott, Murphy & Presser, P.C.

(57) ABSTRACT

Mechanisms for handling website messages (e.g., website certificate warnings and/or errors), while combating website users ignoring such messages (sometimes referred to as "click-through syndrome") are provided. Such mechanisms may comprise providing an interface for handling website messages (e.g., website certificate warnings and/or errors) based on a dynamic policy. In one example, such a dynamic policy may comprise: identifying a first trusted user; monitoring website access by the first trusted user; presenting the first trusted user with a first website message based upon a first access by the first trusted user to a first website; capturing a first response by the first trusted user to the first website message; and utilizing the first response of the first trusted user as a model for subsequent access to the first website.

8 Claims, 4 Drawing Sheets

HANDLING OF WEBSITE MESSAGES

BACKGROUND

The present disclosure relates generally to the field of handling website messages (e.g., website certificate messages).

In various examples, handling of website messages may be implemented in the form of systems, methods and/or algorithms.

Conventionally, depending on the website visited, web browsers give security warning messages such as a website's certificate status, e.g.: "There is a problem with this website's security certificate". Studies have shown that there is a major problem with this. That is, because of the preponderance of these messages, such messages are typically ignored by the majority of website users—potentially putting themselves and their organizations at risk (the more technical the user, the more likely that user would ignore these important messages).

Likewise, website users often ignore the following similar warnings: "Expired Secure Sockets Layer (SSL) certificate warning"; "Domain mismatch warning"; and "Invalid certificate warning (the certificate for the website is not from a 'trusted' certificate authority)".

Additionally, there is a worrying trend, where many users prefer to use browsers that do not show such messages. Further, many users prefer to use browsers with minimal security settings.

SUMMARY

In various embodiments, methodologies may be provided that automatically handle website messages (e.g., website certificate messages).

In one embodiment, a method implemented in a computer system for processing website messages is provided, the method comprising: receiving, by the computer system, an identification of a first user; monitoring, by the computer system, access to a first website by the first user; presenting, by the computer system, a first website message from the first website to the first user after a first access by the first user to the first website; capturing, by the computer system, a first response to the first message by the first user; monitoring, by the computer system, access to a second website by the first user, wherein the first website is distinct from the second website; and processing, by the computer system, at least a second website message from the second website to the first user after a first access by the first user to the second website; wherein the processing of the second message to the first user is based at least in part upon the first response to the first message by the first user.

In another embodiment, a computer readable storage medium, tangibly embodying a program of instructions executable by the computer for processing website messages is provided, the program of instructions, when executing, performing the following steps: receiving, by the computer, an identification of a first user; monitoring, by the computer, access to a first website by the first user; presenting, by the computer, a first website message from the first website to the first user after a first access by the first user to the first website; capturing, by the computer, a first response to the first message by the first user; monitoring, by the computer, access to a second website by the first user, wherein the first website is distinct from the second website; and processing, by the computer, at least a second website message from the second website to the first user after a first access by the first user to the second website; wherein the processing of the second message to the first user is based at least in part upon the first response to the first message by the first user.

In another embodiment, a computer-implemented system for processing website messages is provided, the system comprising: an input element configured to receive an identification of a first user; a first website monitoring element configured to monitor access to a first website by the first user; a presenting element in operative communication with the input element and the first website monitoring element configured to present a first website message from the first website to the first user after a first access by the first user to the first website; a capturing element in operative communication with the input element configured to capture a first response to the first message by the first user; a second website monitoring element configured to monitor access to a second website by the first user, wherein the first website is distinct from the second website; and a processing element in operative communication with the input element and with the second website monitoring element configured to process at least a second website message from the second website to the first user after a first access by the first user to the second website; wherein the processing of the second message to the first user is based at least in part upon the first response to the first message by the first user.

BRIEF DESCRIPTION OF THE DRAWINGS

Various objects, features and advantages of the present invention will become apparent to one skilled in the art, in view of the following detailed description taken in combination with the attached drawings, in which.

DETAILED DESCRIPTION

In one example, one or more systems may provide for automatically handling website messages. In another example, one or more methods may provide for automatically handling website messages. In another example, one or more algorithms may provide for automatically handling website messages.

For the purposes of describing and claiming the present invention the term "instruction to ignore" (such as used in the context of instruction to ignore a message) is intended to refer to providing an indication that a process (such as a web browsing process) is to continue despite the presentation of a warning, error or the like. In one specific example, an instruction to ignore may be provided by clicking a computer user interface button labeled "Ignore", "Cancel" or the like.

As described herein, mechanisms for handling website messages (e.g., website certificate warnings and/or errors), while combating website users ignoring such messages (sometimes referred to as "click-through syndrome") are provided. Such mechanisms may comprise providing an interface for handling website messages (e.g., website certificate warnings and/or errors) based on a dynamic policy.

In one example, such a dynamic policy may comprise: identifying a first trusted user; monitoring website access by the first trusted user; presenting the first trusted user with a first website message (e.g., web certificate warning and/or error) based upon a first access by the first trusted user to a first website; capturing a first response by the first trusted user to the first website message; and utilizing the first response of the first trusted user as a model for subsequent access to the first website. In one specific example, the first model is allowing access by the first trusted user (subsequent to the first access by the first trusted user) to the first website, while concurrently not presenting (that is, suppressing) any associated subsequent warning or error message(s).

In another example, the dynamic policy may further comprise handling a first access to a second website without previous trusted user access by taking into account the type of content on the second website. In one specific example, the handling of the first access to the second website (e.g., suppressing one or more website messages) without previous trusted user access may apply to a first trusted user who had previously accessed the first website. In another specific example, the handling of the first access to the second website (e.g., suppressing one or more website messages) without previous trusted user access may apply to a second user who had not previously accessed the first website.

In another example, the dynamic policy may have configuration options based on one or more items selected from the group including (but not limited to): user identification, organization identification, social network (e.g., a particular user being part of a particular social network) and/or content threat assessment.

In another example, the content threat assessment may be configured such that a first website containing only static HTML is given a lower threat level than a second website accepting user data, and the second website is given a lower threat level than a third website providing content (e.g., for download to a user's computer).

For the purposes of describing and claiming the present invention the term "website message" is intended to refer to a warning, an error or the like. In one example, a website message may be a website certificate warning, a website certificate error or the like.

As described herein, mechanisms for handling website messages are provided. One example may operate as follows: One or more users are selected as "trusted users." In one specific example, the selected "trusted users" are a subset of a larger general group of users. In another specific example, the selection of the "trusted users" may be done by a particular user (e.g., a network administrator of an organization such an employer). The behavior (e.g., website interaction behavior) of the general group of users is then monitored (e.g., with their consent). In particular, the users' behavior when they are confronted by website security warnings, errors and/or the like is monitored. When a given one ("UserA") of the general group of users (which may include the "trusted users") gets a website security warning or error when accessing website "X", a check is made (e.g., transparently to UserA) if one or more of the "trusted users" previously accessed website "X". If yes, then access to website "X" by UserA is transparently allowed without displaying the usual security warnings or errors. On the other hand, if the "trusted users" had previously decided to not access website "X" (e.g., after seeing the website security warnings and/or errors), then access to website "X" is blocked for UserA.

In one specific example, if there are a plurality of "trusted users," then the decision regarding UserA may be made based on what each of the "trusted users" did at website "X" (for example, the decision may be based upon the most common action that the "trusted users" performed at website "X").

In another specific example, if no "trusted users" previously accessed website "X", then when UserA accesses website "X" the associated warnings and/or errors (e.g., website certificate warnings and/or errors) will be displayed for UserA and one or more associated "security users" (e.g., network administrator) will be informed (e.g., transparently informed relative to UserA) of the associated warnings and/or errors.

In another specific example, if no "trusted users" previously accessed website "X," orchestration of the way website security warnings and/or errors are handled for UserA may take into account the type of content on the website. In one specific example, if website "X" is ascertained to contain only static HTML, then this relatively low threat level will be taken into account when deciding whether to show the security message or not (that is, in the case when no "trusted users" have accessed website "X"). In other examples, rules may be applied leveraging explicit and/or organizational and/or social network criteria.

In another embodiment, one or more users may be monitored using a server-side component (e.g., a back-end system) that saves (records) details related to website messages (e.g., security warnings and/or errors). In one specific example, the data related to website messages may be saved in a server-side database. As operation progresses, website users may access various websites and the server-side component may interrogate the database. The behavior of trusted users may be ascertained. In one example, the ascertained behavior may comprise the average and anticipated behavioral reaction from the trusted users. In another example, the ascertained behavior may be based on previously recorded website interaction and/or based on the content that is at a particular website. In one specific example, the server-side component will pull information from the website and ascertain the threat likelihood based upon the following variables (the following are given in increasing order of threat level): (a) static HTML delivering basic text; (b) content that is likely to result in the website user providing information; (c) content that can be downloaded to the user's computer.

If it is decided (e.g., by the back-end system) that the website is likely to be safe, then the security message (e.g., warning or error) will be intercepted at the server-side and hidden from the user browsing the website (the security message that is hidden from the user browsing the website may be stored in a database). The handling of the security message, depending on configuration, may be applied (e.g., for a configurable amount of time) for the specified user or a set of users that this content is likely to be suitable for (in one example, the set of users may be a subset of a larger set of users). For example, if it is ascertained that a specific website is suitable for UserA, then such suitability may be automatically applied for UserB and UserC who also work in the same department as UserA. In another example, if it is ascertained that a specific website is suitable for UserA, then such suitability may be automatically applied for UserD and UserE who are in the same social network.

Figure 1:
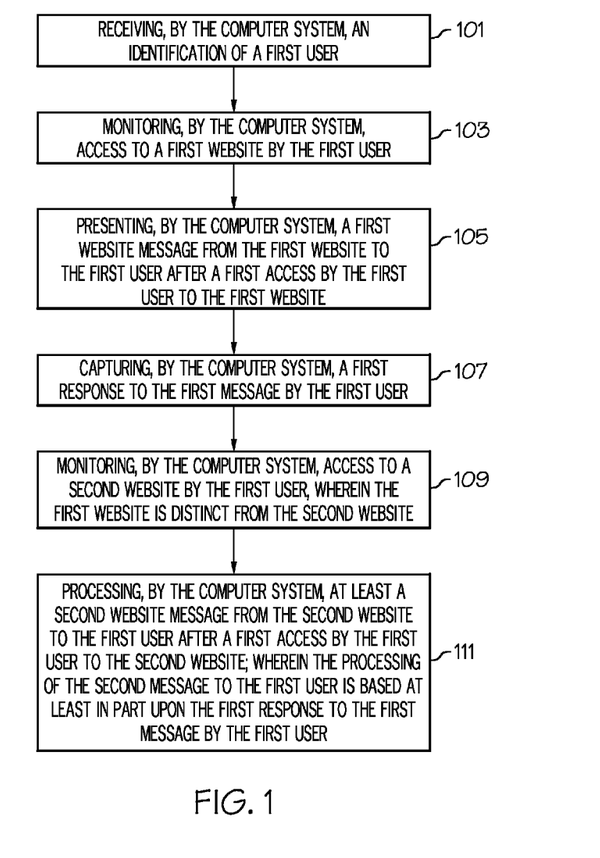
FIG. 1 depicts a flowchart of a method according to an embodiment of the present invention.

Referring now to FIG. 1, a method implemented in a computer system for processing website messages is shown. As seen in this FIG. 1, the method of this embodiment comprises: at 101—receiving, by the computer system, an identification of a first user; at 103—monitoring, by the computer system, access to a first website by the first user; at 105—presenting, by the computer system, a first website message from the first website to the first user after a first access by the first user to the first website; at 107—capturing, by the computer system, a first response to the first message by the first user; at 109—monitoring, by the computer system, access to a second website by the first user, wherein the first website is distinct (that is, different) from the second website; and at 111—processing, by the computer system, at least a second website message from the second website to the first user after a first access by the first user to the second website; wherein the processing of the second message to the first user is based at least in part upon the first response to the first message by the first user.

In one example, any steps may be carried out in the order recited or the steps may be carried out in another order.

Figure 2:
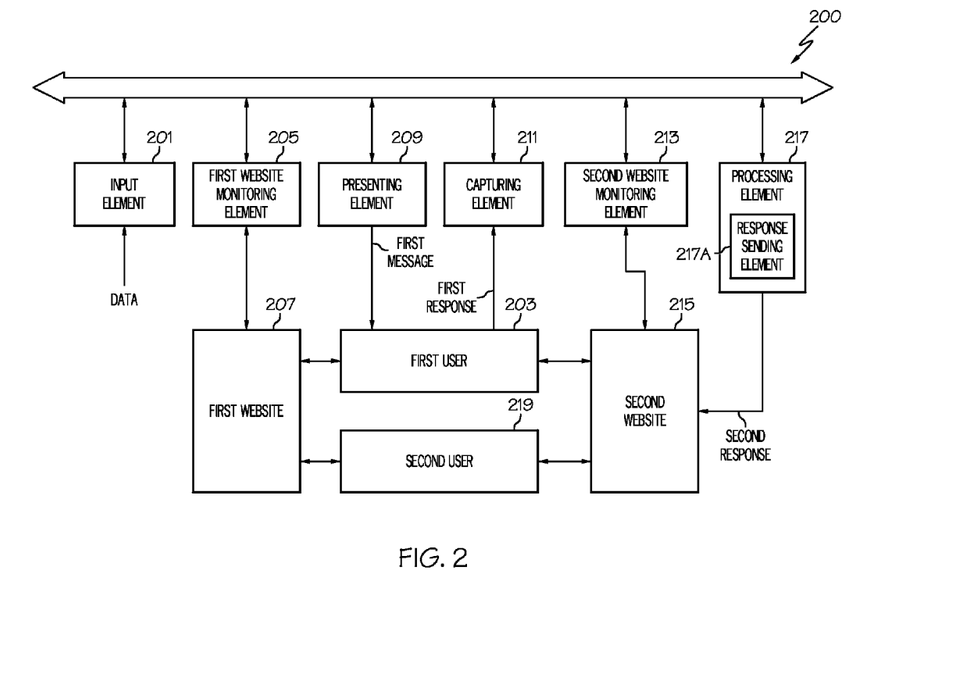
FIG. 2 depicts a block diagram of a system according to an embodiment of the present invention.

Referring now to FIG. 2, in another embodiment, a system 200 for processing website messages is provided. This system may include the following elements: an input element 201 configured to receive an identification of a first user 203 (the identification may be, for example, in the form of data, as shown); a first website monitoring element 205 configured to monitor access to a first website 207 by the first user; a presenting element 209 in operative communication with the input element and the first website monitoring element configured to present a first website message from the first website to the first user after a first access by the first user to the first website; a capturing element 211 in operative communication with the input element configured to capture a first response to the first message by the first user; a second website monitoring element 213 configured to monitor access to a second website 215 by the first user, wherein the first website is distinct from the second website; and a processing element 217 in operative communication with the input element and with the second website monitoring element configured to process at least a second website message from the second website to the first user after a first access by the first user to the second website; wherein the processing of the second message to the first user is based at least in part upon the first response to the first message by the first user. In one example, communication between and among the various entities and/or components may be bi-directional. In another example, the communication may be carried out via the Internet, an intranet, a local area network, a wide area network and/or any other desired communication channel(s). In another example, each of the entities and/or components may be operatively connected to each of the other entities and/or components. In another example, some or all of these components may be implemented in a computer system of the type shown in FIG. 4.

Still referring to FIG. 2, it is seen that in one example: the processing element 217 comprises a response sending element 217A configured to send a second response; and the second response is based at least in part upon the first response.

Still referring to FIG. 2, it is seen that in one example: the input element is configured to receive an identification of a second user (the identification may be, for example, in the form of data, as shown); the first website monitoring element is configured to monitor access to the first website by the second user; and the processing element is configured to process at least a third website message from the first website to the second user after a first access by the second user to the first website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

Still referring to FIG. 2, it is seen that in another example: the input element is configured to receive an identification of a second user (the identification may be, for example, in the form of data, as shown); the second website monitoring element is configured to monitor access to the second website by the second user; and the processing element is configured to process at least a third website message from the second website to the second user after a first access by the second user to the second website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

Of note, while FIG. 2 shows various entities (e.g., first user, second user) communicating, it is to be understood that this FIG. 2 is actually referring to communication by computer system(s) or the like that are owned, leased, operated, used by, in the possession of, and/or controlled by each of the entities.

Figure 3:
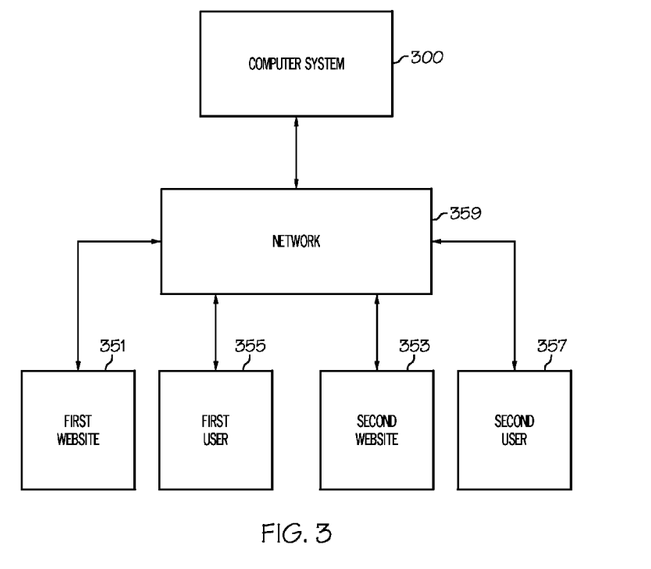
FIG. 3 depicts a block diagram of a system according to an embodiment of the present invention.

Referring now to FIG. 3, in another embodiment, a system 300 for processing website messages is provided. As seen in this FIG. 3, the system 300 may be of the type shown in FIG. 2. Further, communication between and/or among system 300, first website 351, second website 353, first user 355 and second user 357 may be carried out via network 359. In one example, network 359 may comprise the Internet, an intranet, a local area network, a wide area network and/or any other desired communication channel(s). In another example, some or all of these elements may be implemented in a computer system of the type shown in FIG. 4.

Of note, while FIG. 3 shows various entities (e.g., first user, second user) communicating, it is to be understood that this FIG. 3 is actually referring to communication by computer system(s) or the like that are owned, leased, operated, used by, in the possession of, and/or controlled by each of the entities.

Figure 4:
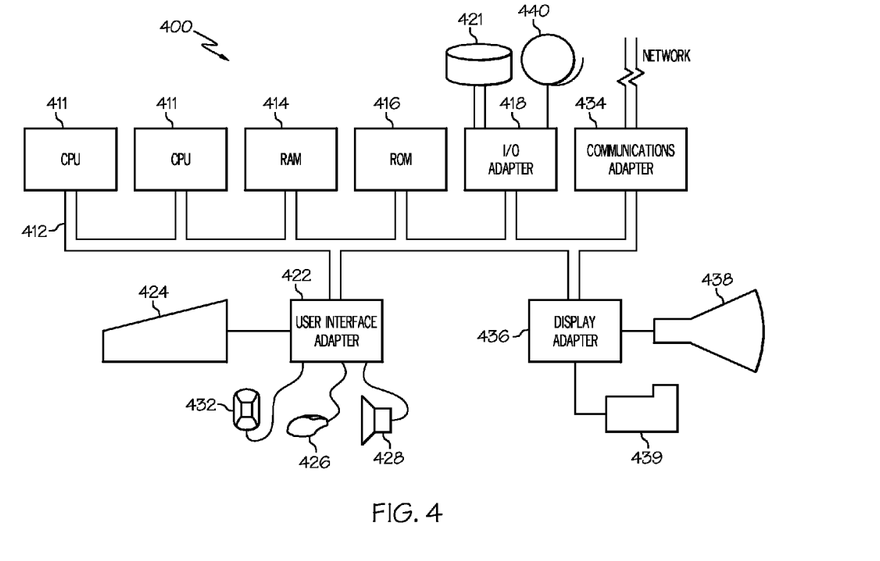
FIG. 4 depicts a block diagram of a system according to an embodiment of the present invention.

Referring now to FIG. 4, this figure shows a hardware configuration of computing system 400 according to an embodiment of the present invention. As seen, this hardware configuration has at least one processor or central processing unit (CPU) 411. The CPUs 411 are interconnected via a system bus 412 to a random access memory (RAM) 414, read-only memory (ROM) 416, input/output (I/O) adapter 418 (for connecting peripheral devices such as disk units 421 and tape drives 440 to the bus 412), user interface adapter 422 (for connecting a keyboard 424, mouse 426, speaker 428, microphone 432, and/or other user interface device to the bus 412), a communications adapter 434 for connecting the system 400 to a data processing network, the Internet, an Intranet, a local area network (LAN), etc., and a display adapter 436 for connecting the bus 412 to a display device 438 and/or printer 439 (e.g., a digital printer or the like).

As described herein, there are conventionally many instances where website users routinely see security messages (e.g., warnings and/or errors). Over a long period of time, the gravity of the security messages typically becomes less weighty to the website user. This may produce behavior that results in user error (e.g., a user may inadvertently disclose personal/confidential information at a website after having disregarded a security message). Various embodiments described herein provide mechanisms for addressing this issue.

As described herein, various embodiments may utilize a dynamic policy comprising handling a first access to a second web site without previous trusted user access to the second website by taking into account the type of content: (a) on a first website where there was previous trusted access; and/or (b) on the second website.

As described herein, various embodiments may provide for content threat assessment that is configured such that a first website containing only static HTML is given a lower threat level than a second web site that accepts user data and the second website is given a lower threat level than a third website providing content (e.g., for download to a user's computer).

As described herein, various embodiments may provide for handling one or more web certificate messages (e.g., warnings or errors), while combating ignoring of such web certificate messages (that is, "click-through syndrome") by one or more website users.

As described herein, mechanisms are provided for orchestrating website use behavior (e.g., the viewing and message response behavior by users of websites that have certificate warnings and/or messages).

In various embodiments, a user, a business or another organization may configure the functionality described herein into their website browsing system(s). In various examples, the functionality may be enabled all of the time, or only under certain circumstances, or not at all. In one specific example, the functionality may be enabled for all users. In another specific example, the functionality may be enabled based on organizational and/or social network criteria (e.g. enable relevant URL for individuals who are more senior than other individuals who are less senior (e.g., a second line manager vs a first line manager)).

In other examples, the functionality may be implemented in a server-side embodiment, a client-side embodiment, or a combination of both.

In another example, a workflow engine (e.g., software engine) may monitor current user activity to motivate desired browsing activity.

In another embodiment, the user/business may specify the rule(s) that help manage the website messages (e.g., certificate warnings and/or errors). In one specific example, this may be implemented by one or more rules whereby access to some or all website content may be motivated by previous URL activity (e.g., by a given party and/or by one or more other parties).

As described herein, various advantages provided by various embodiments may include one or more of the following: (a) in many instances, website users will not have the overhead of deciding whether websites are actually harmful; (b) there may be a decrease in the amount of warnings and/or errors received by users; (c) behavior towards website security may be better implemented; (d) financial and/or IP loss may be reduced (e.g., because there may be fewer victims of threats such as phishing); (e) dynamic creation of "security" exceptions at an individual and/or team level may take into account the current activity and/or role of a given user; and/or (f) website users may become more efficient (e.g., they may be able to focus on completing activities in a shorter time without interruption).

In another example, a user who has previously responded to a website message (e.g., warning and/or error) for a first website by ignoring the website message may have one or more subsequent website messages (e.g., warning and/or error) for the first website and/or a second website automatically suppressed (that is, not shown to that website user) and may be automatically allowed subsequent access to the first website and/or initial access to a second website.

In another example, mechanisms may be provided to monitor the activity and the progress of one or more users (and the information related to security messages may be automatically compiled and saved).

In another example, one or more trusted users may be shown one or more URLs and asked to make recommendations (e.g., security recommendations)

In another example, one or more configurable options may be provided.

In another example, an engine or algorithm (e.g., a software engine or algorithm) may be used to anticipate the next action of a "trusted" user and/or to explicitly allow a given website user to make a browsing decision.

In one embodiment, a method implemented in a computer system for processing website messages is provided, the method comprising: receiving, by the computer system, an identification of a first user; monitoring, by the computer system, access to a first website by the first user; presenting, by the computer system, a first website message from the first website to the first user after a first access by the first user to the first website; capturing, by the computer system, a first response to the first message by the first user; monitoring, by the computer system, access to a second website by the first user, wherein the first website is distinct from the second website; and processing, by the computer system, at least a second website message from the second website to the first user after a first access by the first user to the second website; wherein the processing of the second message to the first user is based at least in part upon the first response to the first message by the first user.

In one example, each of the first message and the second message comprise a web certificate message.

In another example, the first response is an instruction to ignore the first message.

In another example: the first response is an instruction to ignore the first message; and the processing of the second message is based at least in part upon the first response such that the second message is prevented from being presented to the first user.

In another example: the processing of the second message comprises sending a second response, by the computer system, to the second website, and the second response is based at least in part upon the first response.

In another example, the processing of the second message is based at least in part upon a content of the first website and a content of the second website.

In another example, the method further comprises: receiving, by the computer system, an identification of a second user; monitoring, by the computer system, access to the first website by the second user; and processing, by the computer system, at least a third website message from the first website to the second user after a first access by the second user to the first website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

In another example, the method further comprises: receiving, by the computer system, an identification of a second user; monitoring, by the computer system, access to the second website by the second user; and processing, by the computer system, at least a third website message from the second website to the second user after a first access by the second user to the second website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

In another embodiment, a computer readable storage medium, tangibly embodying a program of instructions executable by the computer for processing website messages is provided, the program of instructions, when executing, performing the following steps: receiving, by the computer, an identification of a first user; monitoring, by the computer, access to a first website by the first user; presenting, by the computer, a first website message from the first website to the first user after a first access by the first user to the first website; capturing, by the computer, a first response to the first message by the first user; monitoring, by the computer, access to a second website by the first user, wherein the first website is distinct from the second website; and processing, by the computer, at least a second website message from the second website to the first user after a first access by the first user to the second website; wherein the processing of the second message to the first user is based at least in part upon the first response to the first message by the first user.

In one example, each of the first message and the second message comprise a web certificate message.

In another example, the first response is an instruction to ignore the first message.

In another example: the first response is an instruction to ignore the first message; and the processing of the second message is based at least in part upon the first response such that the second message is prevented from being presented to the first user.

In another example: the processing of the second message comprises sending a second response, by the computer, to the second website, and the second response is based at least in part upon the first response.

In another example, the processing of the second message is based at least in part upon a content of the first website and a content of the second website.

In another example, the program of instructions, when executing, further perform the steps comprising: receiving, by the computer, an identification of a second user; monitoring, by the computer, access to the first website by the second user; and processing, by the computer, at least a third website message from the first website to the second user after a first access by the second user to the first website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

In another example, the program of instructions, when executing, further perform the steps comprising: receiving, by the computer, an identification of a second user; monitoring, by the computer, access to the second website by the second user; and processing, by the computer, at least a third website message from the second website to the second user after a first access by the second user to the second website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

In another embodiment, a computer-implemented system for processing website messages is provided, the system comprising: an input element configured to receive an identification of a first user; a first website monitoring element configured to monitor access to a first website by the first user; a presenting element in operative communication with the input element and the first website monitoring element configured to present a first website message from the first website to the first user after a first access by the first user to the first website; a capturing element in operative communication with the input element configured to capture a first response to the first message by the first user; a second website monitoring element configured to monitor access to a second website by the first user, wherein the first website is distinct from the second website; and a processing element in operative communication with the input element and with the second website monitoring element configured to process at least a second website message from the second website to the first user after a first access by the first user to the second website; wherein the processing of the second message to the first user is based at least in part upon the first response to the first message by the first user.

In one example, each of the first message and the second message comprise a web certificate message.

In another example, the first response is an instruction to ignore the first message.

In another example: the first response is an instruction to ignore the first message; and the processing of the second message is based at least in part upon the first response such that the second message is prevented from being presented to the first user.

In another example: the processing element comprises a response sending element configured to send a second response; and the second response is based at least in part upon the first response.

In another example, the processing of the second message is based at least in part upon a content of the first website and a content of the second website.

In another example: the input element is configured to receive an identification of a second user; the first website monitoring element is configured to monitor access to the first website by the second user; and the processing element is configured to process at least a third website message from the first website to the second user after a first access by the second user to the first website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

In another example: the input element is configured to receive an identification of a second user; the second website monitoring element is configured to monitor access to the second website by second first user; and the processing element is configured to process at least a third website message from the second website to the second user after a first access by the second user to the second website; wherein the processing of the third message to the second user is based at least in part upon the first response to the first message by the first user; wherein the first response is an instruction to ignore the first message; and wherein the processing of the third message is based at least in part upon the first response such that the third message is prevented from being presented to the second user.

In other examples, any steps described herein may be carried out in any appropriate desired order.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any programming language or any combination of one or more programming languages, including an object oriented programming language such as Java, Smalltalk, C++ or the like or a procedural programming language, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention may be described herein with reference to flowchart illustrations and/or block diagrams of methods, systems and/or computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus or other devices provide processes for implementing the functions/acts specified in the flowchart and/or block diagram block or blocks.

The flowcharts and block diagrams in the figures illustrate the architecture, functionality, and operation of possible implementations of systems, methods and computer program products according to various embodiments of the present invention. In this regard, each block in the flowcharts or block diagrams may represent a module, segment, or portion of code, which comprises one or more executable instructions for implementing the specified logical function(s). It should also be noted that, in some implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

It is noted that the foregoing has outlined some of the objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the features and applications of the invention. Other beneficial results can be realized by applying the disclosed invention in a different manner or modifying the invention in ways known to those familiar with the art. In addition, all of the examples disclosed herein are intended to be illustrative, and not restrictive.

What is claimed is:
1. A method implemented in a computer system for processing website messages, the method comprising:
receiving, by the computer system, an identification of a first user;
monitoring, by the computer system, access to a first website by the first user;

presenting, by the computer system, a first message from the first website to the first user after a first access by the first user to the first website;

capturing, by the computer system, a first response to the first message by the first user;

monitoring, by the computer system, access to a second website by the first user, wherein the first website is distinct from the second website; and processing, by the computer system, at least a second message from the second website to the first user after a first access by the first user to the second website;

wherein the processing of the second message to the first user is based at least in part upon the first response to the first message by the first user;

wherein the method further comprises:

receiving, by the computer system, an identification of a second user;

monitoring, by the computer system, access to the first website by the second user; and processing, by the computer system, at least a third message from the first website to the second user after a first access by the second user to the first website;

wherein the processing of the third message to the second user is based at least in part upon the first response to the first message by the first user;

wherein the first response is an instruction to ignore the first message; and wherein the processing of the third message is based at least in part upon the first response, wherein the third message is prevented from being presented to the second user.

2. The method of claim 1, wherein each of the messages comprises a web certificate message.

3. The method of claim 1, wherein the processing of the third message is based at least in part upon a content of the first website and a content of the second website.

4. A storage device readable by a computer, the storage device tangibly embodying a program of instructions executable by the computer for processing website messages, the program of instructions, when executing, performing the following steps:

receiving, by the computer, an identification of a first user;

monitoring, by the computer, access to a first website by the first user;

presenting, by the computer, a first message from the first website to the first user after a first access by the first user to the first website;

capturing, by the computer, a first response to the first message by the first user;

monitoring, by the computer, access to a second website by the first user, wherein the first website is distinct from the second website; and processing, by the computer, at least a second message from the second website to the first user after a first access by the first user to the second website;

wherein the processing of the second message to the first user is based at least in part upon the first response to the first message by the first user;

wherein the program of instructions, when executing, further performs the following steps:

receiving, by the computer, an identification of a second user;

monitoring, by the computer, access to the second website by the second user; and processing, by the computer, at least a third message from the second website to the second user after a first access by the second user to the second website;

wherein the processing of the third message to the second user is based at least in part upon the first response to the first message by the first user;

wherein the first response is an instruction to ignore the first message; and wherein the processing of the third message is based at least in part upon the first response, wherein the third message is prevented from being presented to the second user.

5. The storage device of claim 4, wherein each of the messages comprises a web certificate message.

6. The storage device of claim 4, wherein the processing of the third message is based at least in part upon a content of the first website and a content of the second website.

7. A computer-implemented system for processing website messages, the system comprising:

a processor; and a memory storing computer readable instructions, wherein the computer readable instructions, when executed by the processor, implement:

an input element configured to receive an identification of a first user and an identification of a second user;

a website monitoring element configured to: (a) monitor access to a first website by the first user; (b) monitor access to a second website by the first user, wherein the first website is distinct from the second website; and (c) monitor access to the first website by the second user;

a presenting element in operative communication with the input element and the website monitoring element configured to present a first message from the first website to the first user after a first access by the first user to the first website;

a capturing element in operative communication with the input element configured to capture a first response to the first message by the first user; and a processing element in operative communication with the input element and with the website monitoring element configured to process at least a second message from the second website to the first user after a first access by the first user to the second website;

wherein the processing of the second message to the first user is based at least in part upon the first response to the first message by the first user;

wherein the processing element is further configured to process at least a third message from the first website to the second user after a first access by the second user to the first website;

wherein the processing of the third message to the second user is based at least in part upon the first response to the first message by the first user;

wherein the first response is an instruction to ignore the first message; and wherein the processing of the third message is based at least in part upon the first response, wherein the third message is prevented from being presented to the second user.

8. The system of claim 7, wherein each of the messages comprises a web certificate message.

* * * * *